United States Patent
Thomasset et al.

(10) Patent No.: US 8,210,390 B2
(45) Date of Patent: *Jul. 3, 2012

(54) CONTAINER FOR WINE OR SIMILAR BEVERAGE

(75) Inventors: Jacques Thomasset, Vouvry (CH); Stéphane Mathieu, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 164 days.

This patent is subject to a terminal disclaimer.

(21) Appl. No.: 12/596,733

(22) PCT Filed: Nov. 27, 2007

(86) PCT No.: PCT/IB2007/054795
§ 371 (c)(1),
(2), (4) Date: Dec. 18, 2009

(87) PCT Pub. No.: WO2008/129369
PCT Pub. Date: Oct. 30, 2008

(65) Prior Publication Data
US 2010/0116770 A1    May 13, 2010

(30) Foreign Application Priority Data
Apr. 20, 2007  (EP) .................................. 07106589

(51) Int. Cl.
*B65D 6/28*  (2006.01)
(52) U.S. Cl. ....... 220/613; 220/610; 428/36.6; 428/36.7
(58) Field of Classification Search ................. 428/35.7, 428/36.6, 36.7, 36.9, 36.91; 215/12.2; 206/524.1, 206/524.2, 524.3, 526.6; 220/610, 613
See application file for complete search history.

(56) References Cited

U.S. PATENT DOCUMENTS

| | | | |
|---|---|---|---|
| 4,728,549 A | | 3/1988 | Shimizu et al. |
| 6,121,374 A | * | 9/2000 | Montanari et al. ............... 525/63 |
| 6,127,456 A | * | 10/2000 | Montanari et al. ............ 523/201 |
| 6,239,216 B1 | * | 5/2001 | Montanari et al. ............... 525/66 |
| 6,281,287 B1 | * | 8/2001 | Montanari et al. ............... 525/63 |
| 6,506,830 B1 | * | 1/2003 | Bussi et al. ................... 524/495 |
| 2009/0061037 A1 | * | 3/2009 | Sander ........................ 425/326.1 |
| 2010/0116770 A1 | * | 5/2010 | Thomasset et al. ........... 215/12.2 |
| 2010/0119743 A1 | * | 5/2010 | Thomasset ................... 428/35.1 |
| 2010/0186352 A1 | * | 7/2010 | Thomasset et al. .............. 53/440 |

FOREIGN PATENT DOCUMENTS

| | | |
|---|---|---|
| EP | 1 449 646 | 8/2004 |
| JP | 1-153453 | 6/1989 |

OTHER PUBLICATIONS

International Search Report for PCT/IB2007/054795, mailed May 7, 2008.
Written Opinion of the International Searching Authority for PCT/IB2007/054795, mailed May 7, 2008.
Database Abstract; Accession No. 1992-370520; & JP 04-272825, (Sep. 29, 1992), 1 page.

* cited by examiner

*Primary Examiner* — N. Edwards
(74) *Attorney, Agent, or Firm* — Nixon & Vanderhye P.C.

(57) ABSTRACT

Container with an opening and closing element (5) for wine or a similar beverage, comprising three distinct elements (2-4) made of plastic and assembled by welding, these being a flexible laminate (2) that forms the side wall of the said container, an end wall (4) and a shoulder (3) comprising a neck; characterized in that at least one of the three elements (2-4) is oxygen impermeable and in that at least one other element (2-4) is oxygen permeable.

7 Claims, 1 Drawing Sheet

CONTAINER FOR WINE OR SIMILAR BEVERAGE

This application is the U.S. national phase of International Application No. PCT/IB2007/054795, filed 27 Nov. 2007, which designated the U.S. and claims priority to Europe Application No. 07106589.0 filed 20 Apr. 2007, the entire contents of each of which are hereby incorporated by reference.

FIELD OF THE INVENTION

The present invention relates to containers intended for keeping an alcoholic beverage, e.g. wine, for an appropriate length of time so that the qualities of the beverage are optimized by the time it is consumed.

PRIOR ART

The length of time for which wine is kept is an important criterion in ensuring the optimum quality of the product. In general, wine is contained in glass bottles.

Depending on the type of vine, on the winemaking process or on other criteria, it is sometimes necessary for wine to be kept or laid down for many years before it can be drunk. Thus, when a wine has been newly bottled, its immediate consumption will not generally allow its potential to be fully realized; a wine that is too young is firm and rarely balanced. On the other hand, a wine drunk too late is past its best or often madeirized; it has lost its substance and becomes unfit for consumption. It is therefore desirable for wine to be drunk at its prime; when the flavour and substance have developed to the full. The mechanism whereby wines are aged is a complex process dependent on the type of wine, the winemaking process and how it is kept.

There are many factors that affect the quality of the wine while it is being kept in the bottle. Variations in temperature and pressure are known to have a detrimental effect on the cellaring of wine. Variations in temperature alter the pressure inside the bottle because of the contraction or expansion of the volume of air trapped in the head space. Variations in temperature and pressure inside the bottle are often generated during transport. Air freight is able to generate strong negative pressures in the bottle.

It would therefore be desirable to be able to drink sooner a wine which, under normal circumstances, ought to be kept for many years before being drunk.

GENERAL SUMMARY OF THE INVENTION

A first problem that the present invention proposes to solve lies in the minimum length of time for which wine or another similar beverage needs to be kept in order to allow the product to develop its optimum quality.

Another problem that the invention proposes to solve is that of reducing the impact that transport has on how wine keeps by reducing the variations in pressure inside the container.

In the invention, the solution to the aforementioned problems is to accelerate the ageing of the wine through controlled oxidation so as to offer the option of drinking the said wine sooner. More generally, it is an object of the present invention to predefine and to control the length for which a wine or similar beverage is kept.

To these ends, the invention relates to a container with an opening and closing element for wine or a similar beverage, comprising three distinct elements made of plastic and assembled by welding, these being of flexible laminate that forms the side wall of the said container, and end wall and a shoulder comprising a neck; characterized in that at least one of the three elements is oxygen impermeable and in that at least one other element is oxygen permeable.

The flexible part of the container is able to absorb the pressure variations brought about during transport and/or where the container is subjected to temperature variations.

The invention allows a wine or similar beverage to be combined with a container of controlled oxygen permeability; the oxygen permeability being defined according to the length of time for which the beverage is to be kept.

The invention allows the container permeability properties to be fine-tuned to the wine being kept and the desired length of ageing.

According to a first embodiment of the invention, the container is used for rapid oxidation of the wine and a short cellaring time. In this case, the end wall and the neck of the container are of high oxygen permeability.

In a second embodiment of the invention, the rate of oxidation of the wine is reduced by lowering the permeability of the end wall or of the neck. The rate at which the wine oxidizes is halved and the length of time for which the wine can be kept is approximately doubled.

In a third embodiment of the invention, the rate at which the wine oxidizes is greatly reduced by reducing the respective permeabilities of the end wall, of the neck and of the stopper in concert. The length of time for which the wine can be kept may be far longer.

The present invention offers numerous advantages: in particular it allows a wine to be brought to an optimum level of maturity at its moment of consumption; it allows the properties of the container to be tailored to suit a type of wine (vine, winemaking process, potential for being laid down, etc.); it allows the ageing of the wine to be accelerated through controlled oxidation while it is being kept in the container; and, finally, it is able to let the consumer know when the product should be drunk.

BRIEF DESCRIPTION OF THE DRAWING'S

Figure 3:
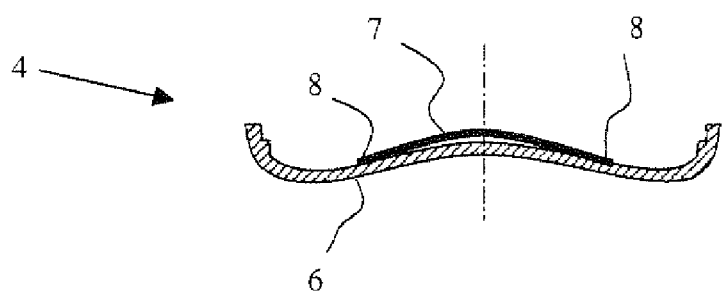

FIG. 3 illustrates an end wall 4 that has a low permeability film 7 partially covering the moulded component 6.

DETAILED DESCRIPTION OF THE INVENTION

The invention is described in greater detail hereinbelow through examples illustrated by a single figure which depicts a container for controlling the rate at which the wine oxidizes. This packaging comprises four plastic elements, namely a laminate forming the side wall 2 which limits the variations in pressure within the container, an end wall 3, a shoulder 4 comprising a neck, and a stopper 5 for opening and closing the container. The container according to the invention is characterized in that the laminate and the shoulder are oxygen impermeable and in that the end wall and/or the stopper are at least partially oxygen permeable.

The laminate that forms the side wall 2 is made up of several layers, at least one of which is a layer with an oxygen barrier effect; the said barrier layer being, for example, a sheet of aluminium or a layer of EVOH. In the description of the invention, the term impermeable is used to qualify the permeability of the laminate with respect to oxygen, which implies that the permeability of the said laminate is low by comparison with the permeability of the other parts of the container. With this in mind, the use of the term impermeable to qualify the properties of the laminate does not necessarily mean that it has zero permeability to oxygen. The laminate also comprises welding layers that allow the laminate to be attached to the neck and to the end wall of the container; the said welding layers being, for example, layers made of PE or PP. There are a wide variety of multilayer structures available that will allow the properties of the container to be tailored to the product packaged and the desired effect. Thus, the laminate may be transparent or opaque, it may be very flexible or slightly rigid, it may have a gloss or matt surface finish, it may be printed locally or over its entire surface area. The thickness of the laminate generally ranges between 100 and 500 microns. The surface area of the laminate represents approximately 60% to 90% of the total surface area of the container and preferably represents between 65% and 85%.

The side wall 2 of the container 1 may be manufactured using several methods. A preferred method is to use a laminate in the form of a sheet and which comes in reels, to weld the ends of the laminate together in a continuous or discontinuos process to form a tubular body. This method is particularly advantageous because decoration can be applied to the sheet in its flat state before it is made up into a tubular body. Another method is to co-extrude a tubular body in order to form the side wall 2 of the container. Such a method is often less advantageous because it entails printing on the tubular body and provides a restricted choice of multilayer structure.

The side wall 2 of the container 1 is connected at its ends to a shoulder 3 and to an end wall 4 the oxygen impermeability properties of which are tailored to suit the length of time for which the wine is to be kept. The thickness of these parts is at least equal to the thickness of the laminate and preferably twice as thick. The shoulder may be manufactured by injection moulding, compression moulding or extrusion blow-moulding. The side wall 2 may be assembled with the shoulder 3 by welding or by overmoulding. The end wall may be manufactured by injection moulding, compression moulding or thermoforming. The end wall 4 may be assembled with the side wall 2 by welding or by overmoulding. According to a preferred method of manufacture, the side wall 2 is assembled with the shoulder 3 and the end wall 4 by welding.

Wines can absorb a certain amount of oxygen before they are drunk; the optimum amount is dependent on numerous parameters such as the type of wine and the winemaking process. For a given wine, it is highly advantageous to be able to adjust the rate of oxidation to suit the length of time for which the said wine is to be kept in the bottle. By way of example, in the remainder of the description of the invention, we shall consider a wine that is optimally aged after it has absorbed 20 ppm of oxygen while being kept in the bottle.

A first embodiment of the invention consists in producing a container 1 for keeping the wine for a short length of time; the said short length of cellaring time generally being 6 months after bottling. The container has an overall oxygen permeability of 0.114 ppm/day/bar when the container is kept in the open air using known storage methods suited to wine. It is generally recommended that temperature variations be avoided during the storage period. The container 1 according to this first embodiment has high oxygen permeability so as to allow the wine to oxidize sufficiently over a short cellaring time. This container comprises at least an end wall and a shoulder made with a resin the oxygen permeability of which is in excess of 1000 ccO2.µm/m$^2$/day/bar in a gas made up of 100% oxygen and, preferably, in excess of 10,000 cc.µm/m$^2$/day/bar. The container is particularly advantageous when the shoulder 3 and the end wall 4 are made of PP or PE. According to the first embodiment of the invention, the stopper is generally made of PP or PE and may also contain an element which improves its impermeability with respect to oxygen. In order to improve the barrier properties of the stoppers it is common practice to add a seal which simultaneously seals and provides barrier properties. In order to fine-tune the total permeability of the container it is possible to adjust the permeabilities of the resins used to form the end wall, the shoulder and the stopper, or to alter the respective geometries of the end wall and of the shoulder (thickness, surface area). It is easy, for example, to adjust the permeability properties of a shoulder made of PE by blending LDPE with HDPE. The permeability properties of the container are tailored according to the volume of wine contained in the container. The smaller the volume of the container, the lower the permeability of the container for the same cellarage time.

A second embodiment of the invention makes it possible to produce a container for cellaring wine for a modest period of time, said modest cellarage period generally being 12 months after bottling. The container has an overall oxygen permeability of 0.057 ppm/day/bar when the container is kept in the open air according to known storage methods suited to wine. The container 1 produced according to the second embodiment of the invention is characterized in that just one end of the container is oxygen permeable. A first example of a container produced according to the second embodiment has a side wall 2 that is oxygen impermeable, a shoulder 3 that is oxygen impermeable and an end wall that is highly oxygen permeable. A second example of a container according to the invention has a side wall 2 and an end wall 4 that display barrier properties, and an oxygen permeable shoulder 2. The stopper 5 generally has low oxygen permeability. According to a second embodiment of the invention, the permeability of the container is halved; just one end of the container being oxygen permeable. According to a second embodiment of the invention, the permeability of the end that has the barrier properties is approximately 10 to 100 times lower than the permeability of the other end. The permeable end has an oxygen permeability in excess of 1000 ccO2.µm/m$^2$/day/bar in a gas made up of 100% oxygen and is preferably greater than 10,000 ccO2.µm/m$^2$/day/bar. The container according to the invention is particularly advantageous when the permeable end is made of PP or PE. The impermeable end generally has a multilayer structure combining a polyolefin (PP or PE) with an oxygen barrier resin such as EVOH. The barrier resin used to improve the oxygen impermeability of the shoulder 3 or of the end wall 4 has a permeability of less than 1000 ccO2.µm/m$^2$/day/bar in a gas made of 100% oxygen, and preferably of less than 100 ccO2.µm/m$^2$/day/bar. The multilayer component may be manufactured by multiple-shot injection moulding, by injection overmoulding of film, by a multilayer compression moulding, by thermoforming a multilayer sheet, by multilayer extrusion blow moulding. Another method of manufacture is to make a thin surface coating on the part and improve the barrier properties. Another method is to blend several resins or add oxygen absorbers. The overall oxygen permeability of the container 1 produced according to the second embodiment of the invention can be altered by altering the permeability of the stopper, the geometry, thickness, choice of resins and the position of the barrier layer.

A third embodiment of the invention makes it possible to produce a container for longer-term storage of wine, it being possible for said longer storage period to be as much as 5 years after bottling. The container 1 has an overall oxygen permeability of 0.011 ppm/day/bar when the container is kept for 5 years in the open air according to the known storage methods suited to wine. This container is characterized in that all the elements of which it is made, namely the side wall 2, the shoulder 3, the end wall 4 and the stopper 5 have good oxygen barrier properties. As a preference, the shoulder 3 and the end wall 4 comprise a multilayer structure; said multilayer structure comprising at least one layer the oxygen permeability of which is less than 1000 ccO2.μm/m$^2$/day/bar in a gas made up of 100% oxygen and preferably less than 100 ccO2.μm/m$^2$/day/bar.

The invention makes it possible to produce containers for a wine storage period of between 6 months and 5 years. To keep the wine for three years, the overall permeability of the container is tailored such that after three years the oxidation of the wine has reached an optimum point. After three years, the wine has absorbed the optimum amount of oxygen, the said amount being 20 ppm for the wine considered in the description of the invention. The barrier properties of the shoulder 3, of the end wall 4 and of the stopper 5 are tailored such that the wine absorbs the aforementioned amount in the given period of time. It is advantageous to fine-tune the barrier properties of the container by varying the surface area of the container that is impermeable to oxygen. For example, it is possible to make an end wall of which 80% of the surface area is oxygen impermeable and 20% of the surface area is oxygen permeable. This end wall may be produced for example by overmoulding a barrier film which covers only 80% of the total surface area. Another method might be to mould a multilayer end wall and tailor the propagation of the barrier layer during manufacture by injection moulding or compression moulding.

The container according to the invention can be made with a wide variety of resins. For example, this container may contain polyester resins (PET, PEN), polyolefins (PE, PP), polyamide resins, resins for improving the barrier properties (EVOH, PVDC, PAMXD6). This container may also contain metallic layers such as an aluminium layer for example.

The container described according to the invention is advantageous because the oxygen permeable area can be fine-tuned; it is therefore easy to fine-tune the rate of oxidation of the wine and the length of time for which it will keep. The oxygen permeabilities of the end wall 4, of the shoulder 3 and of the stopper 5 can be tailored independently, leading to a broad range of variation in the permeability of the container and therefore in the storage times that can be very short or, on the other hand, very long.

The container according to the invention is particularly advantageous because it reduces pressure variations while the wine is being kept by virtue of a flexible wall which deforms under the effect of a negative relative pressure in the bottle. The container is able to reduce the negative impact of transport on how wine keeps and ages.

Figure 1:
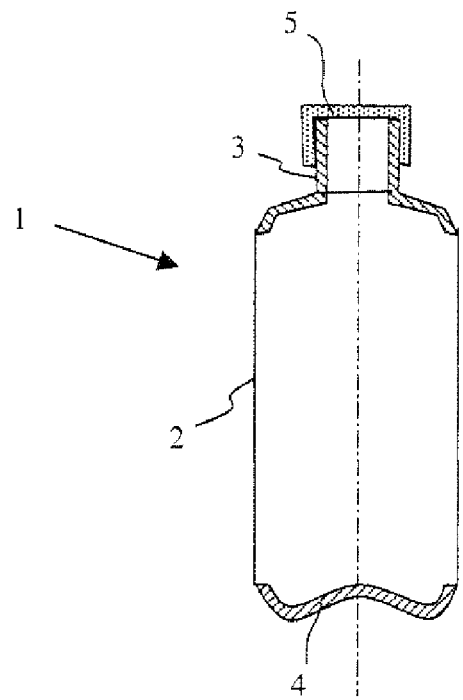
FIG. 1 depicts the cross section of a container for controlling the rate at which wine oxidizes.
Figure 2:
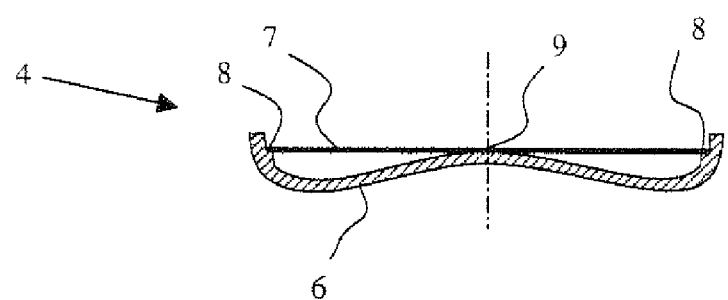
FIG. 2 illustrates an end wall geometry with a domed component 6.

One particularly advantageous embodiment of the invention for tailoring the permeability of the packaging is illustrated and described hereinbelow. This embodiment consists in producing an end wall with controlled permeability. This end wall 4 illustrated in FIGS. 2 and 3 is formed of a moulded component 6 of high oxygen permeability and of a film 7 of low oxygen permeability at least partially covering the said component 6. The film 7 is sealed on to the component 6, generally by welding around the periphery of the film 7. FIG. 2 illustrates an end wall geometry with a domed component 6. The film 7 is in contact with the component 6 over only part of its surface area and at least around its periphery 8. The central part 9 of the film 7 is possibly welded to the component 6 so as to stiffen the end wall 4. The end wall 4 illustrated in FIG. 2 has low oxygen permeability thanks to the film 7 which covers the entire internal surface area of the component 6. The film 7 which lies on the inside of the packaging is in contact with the wine; a film suited for contact with food substances should therefore be chosen. Air or a gas may be trapped between the film 7 and the moulded component 6. The trapping of air can be used to improve the impact strength of the packaging.

The permeability of the end wall 4 is tailored by modifying the surface area of the film 7 covering the component 6. FIG. 3 illustrates an end wall 4 that has a low permeability film 7 partially covering the moulded component 6. This film 7 is welded to the surface of the component 6 forming the interior wall of the packaging. The film 7 is at least connected in a sealed fashion to the moulded component 6 by welding of its edge 8 around its entire periphery.

An alternative form of embodiment of the end wall 4 is to weld the film 7 to the external surface of the moulded component 6. In this case, the trapping of air is to be avoided or needs to be carefully controlled because the oxygen contained in this air volume alters the ageing of the wine.

The film 7 is fixed in a sealed fashion to the component 6, generally by welding. This welding can be done using the various methods in use on the market. Mention will, however, be made in particular of hot welding, induction welding, ultrasonic welding, hot air welding, etc. These technologies are perfectly controlled on the market. It is possible to add a weld to another part of the component in order to improve the cohesion of the 2 parts.

The material of which the film 7 is made will preferably be compatible with the material of which the component 6 is made in order to allow welded assembly. Assembly may be effected as an additional operation on a specially designed assembly machine. It may also be performed in line, at the time of manufacture of the packaging. At the present time, the components 6 of which the end wall 4 are made are generally made of PE or of PP but this technique of adding a barrier could equally well be applied to other materials such as PET, PA or any other thermoplastic.

The barrier of the film 7 is applied through a functional layer such as EVOH, metallization, Siox or Alox coating, or any other barrier technology available on the film market. This variety of films makes it possible to conceive a vast range of barrier levels. This barrier could equally be of different types, such as barriers to oxygen, barriers to CO2, barriers to flavours, to mention only those which are most commonplace.

This functional layer is associated at least with a welding layer compatible with the component 6. It is then possible to conceive of adding one or more other layers according to the functions that this film 7 and/or this component 6 is to perform. It is thus possible to have a protective layer, an anti-puncture layer, or alternatively a printed layer. The film 7 is produced according to technologies that are known for the production of films such as coextrusion, complexing (or laminating), hot lamination (or extrusion-lamination).

The invention claimed is:

1. A container with an opening and closing element for wine or a similar beverage, comprising three distinct elements made of plastic, manufactured separately and assembled by welding, these three distinct elements being:
    a flexible laminate that forms a side wall of the said container,
    an end wall of the container, and
    a shoulder of the container comprising a neck;
    wherein said flexible laminate is oxygen impermeable,
    wherein at least one of the end wall or the shoulder is also oxygen impermeable, and wherein one of the three distinct elements is oxygen permeable.

2. The container according to claim 1 in which a surface area of the laminate represents 60% to 90% of a total surface area of the container.

3. The container according to claim 1 in which a surface area of the laminate represents 65% to 85% of a total surface area of the container.

4. The container according to claim 1 wherein the shoulder is oxygen impermeable.

5. The container according to claim 4 wherein the end wall is oxygen permeable.

6. The container according to claim 1 wherein the end wall is oxygen impermeable.

7. The container according to claim 1 wherein the opening and closing element is oxygen permeable.

* * * * *